(12) United States Patent
Muraji

(10) Patent No.: US 6,976,667 B2
(45) Date of Patent: Dec. 20, 2005

(54) OPENING-CLOSING VALVE DRIVING APPARATUS OPERATED BY ELECTROMAGNETIC ACTUATOR

(75) Inventor: Tetsuo Muraji, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 119 days.

(21) Appl. No.: 10/415,498

(22) PCT Filed: Oct. 17, 2001

(86) PCT No.: PCT/JP01/09122

§ 371 (c)(1),
(2), (4) Date: Apr. 30, 2003

(87) PCT Pub. No.: WO02/37006

PCT Pub. Date: May 10, 2002

(65) Prior Publication Data

US 2004/0008100 A1    Jan. 15, 2004

(51) Int. Cl.[7] ............................................. F16K 31/02
(52) U.S. Cl. ..................... 251/129.19; 251/129.08; 251/129.16; 251/129.2; 123/90.11; 335/264
(58) Field of Search ................ 251/129.01, 129.08, 251/129.15, 129.19, 129.16; 335/255, 264; 123/90.11

(56) References Cited

U.S. PATENT DOCUMENTS

| 3,295,079 A | * 12/1966 | Brown ........................ 335/255 |
| 4,605,197 A | * 8/1986 | Casey et al. ............. 251/30.01 |
| 4,715,331 A | 12/1987 | Kreuter |
| 5,645,019 A | 7/1997 | Liang et al. |
| 6,003,481 A | 12/1999 | Pischinger et al. |
| 6,116,570 A | 9/2000 | Bulgatz et al. |

FOREIGN PATENT DOCUMENTS

| DE | 197 12 055 | 10/1998 |
| EP | 1 041 252 | 10/2000 |
| EP | 1045116 A1 | 10/2000 |
| JP | 11-13435 | 1/1999 |
| JP | 2000-199411 | 7/2000 |

OTHER PUBLICATIONS

Microfilm of the specification and drawings annexed to the request of Japanese Utility Model Application No. 128541/1987 (Laid-open No. 35273/1989) (Kounan Denki K.K.), Mar. 3, 1989.

Microfilm of the specification and drawings annexed to the request of Japanese Utility Model Application No. 149430/1985 (Laid-open No. 56880/1987) (Asian Industry Co., Ltd.), Apr. 8, 1987.

* cited by examiner

*Primary Examiner*—Ramon M. Barrera
(74) *Attorney, Agent, or Firm*—Wenderoth, Lind & Ponack, L.L.P.

(57) ABSTRACT

A coupling unit provides a coupling between a valve element of an opening-closing valve and a moving element of an electromagnetic actuator so as to enable mutual movement of the two elements relative to each other within a predetermined restricted range. Accordingly, it is possible to provide an opening-closing valve driving apparatus that can reduce power consumption of the electromagnetic actuator and is excellent in responsivity.

5 Claims, 11 Drawing Sheets

OPENING-CLOSING VALVE DRIVING APPARATUS OPERATED BY ELECTROMAGNETIC ACTUATOR

TECHNICAL FIELD

The present invention relates to an opening-closing valve driving apparatus for driving a valve such as an intake valve or an exhaust valve of an internal combustion engine by an electromagnetic actuator.

BACKGROUND ART

An electromagnetic actuator that drives an intake valve and an exhaust valve of an internal combustion engine to open and close is disclosed in Japanese Patent Laid-Open Publication No. 2000-199411. For the internal combustion engine, it is demanded to reduce the time required for opening and closing the intake and exhaust valves during high-speed rotation and to increase the amount of valve lift.

In order to reduce the time for opening and closing the intake and exhaust valves, it is required to improve the speed of opening and closing the valves. The improvement of the speed requires an increase in force generated by the electromagnetic actuator, and therefore increasing the size of a magnet of a moving element of the actuator is one of resolutions to be considered.

However, increasing the size causes the weight of the moving element to be increased. Therefore, there occur problems such that it is difficult to obtain a desired speed of an opening-closing valve and to achieve a desired response of the opening-closing valve.

Moreover, in order to control high-speed response of the opening-closing valve, for example, electromagnetic energy has to be supplied to the electromagnetic actuator in a short period of 1 millisecond or 2 milliseconds. This requires a large amount of power. Therefore, this method has another problem in that an enormous amount of power is consumed.

The present invention has been achieved to solve the above-mentioned problems in the conventional technology. It is an object of this invention to provide an opening-closing valve driving apparatus having excellent responsivity, that is, to provide an opening-closing valve driving apparatus capable of ensuring a desired lift amount of the opening-closing valve and reducing power consumption of the electromagnetic actuator.

DISCLOSURE OF THE INVENTION

The opening-closing valve driving apparatus according to the present invention comprises an electromagnetic actuator having an electromagnetic coil and a moving element that moves in response to excitation of the electromagnetic coil, and a coupling unit. The coupling unit couples the moving element to a valve element of the opening-closing valve so that the moving element can move relative to the valve element within a predetermined restricted range in a moving direction of the moving element.

BEST MODE FOR CARRYING OUT THE INVENTION

Figure 1:
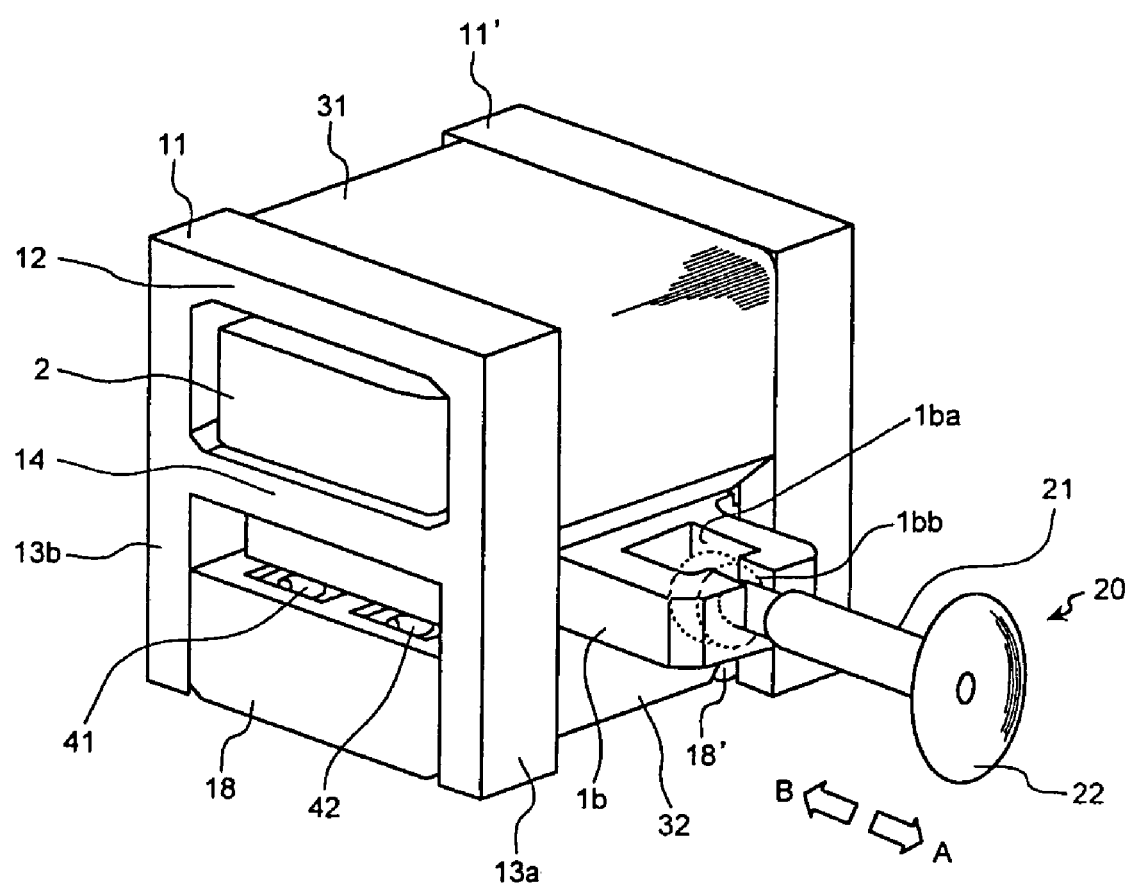
FIG. 1 is a perspective view showing an opening-closing valve driving apparatus according to a first embodiment of the present invention.
Figure 2:
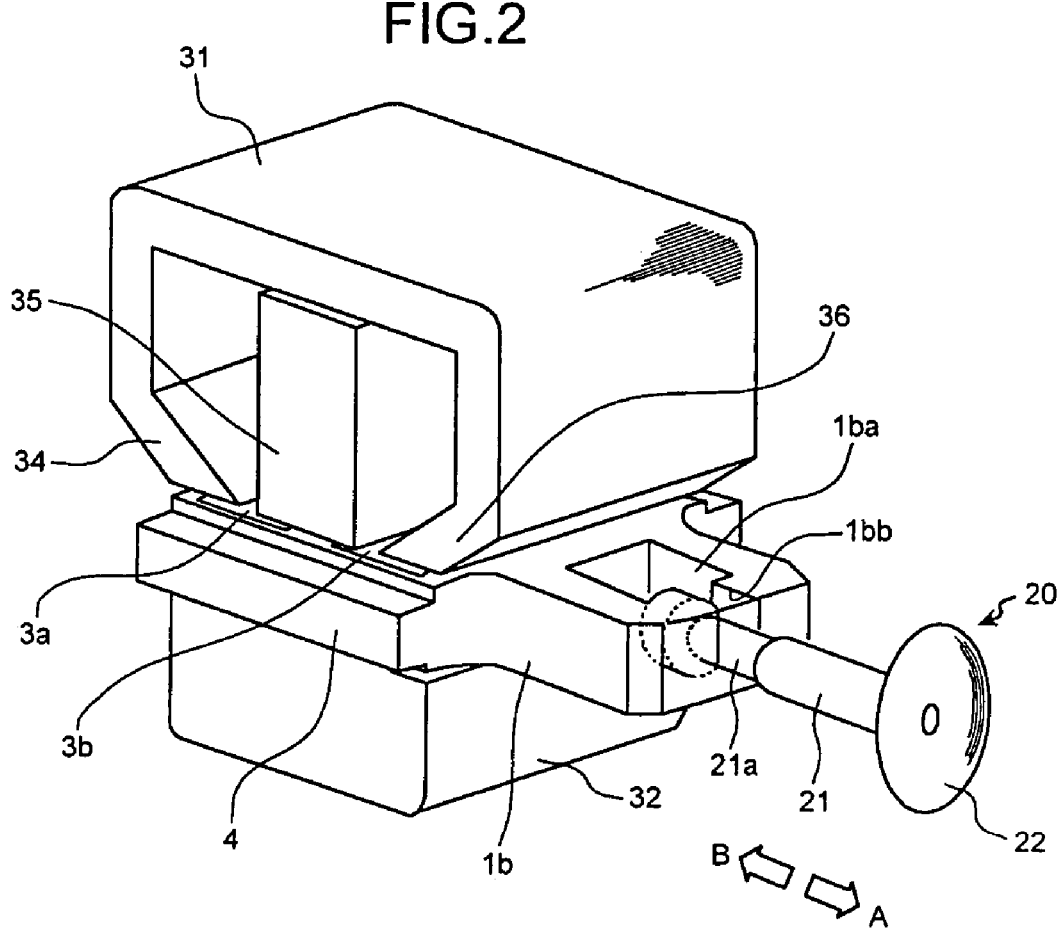
FIG. 2 is a perspective view showing the opening-closing valve driving apparatus of FIG. 1 and not including a supporting frame and a winding.

Embodiments of the present invention are explained with reference to the accompanying drawings.

FIG. 1 to FIG. 4 show an opening-closing valve driving apparatus as a first embodiment of the present invention.

In the opening-closing valve driving apparatus, a moving element 1 is coupled to a valve rod 21 of a valve element 20 of an opening-closing valve as an intake valve of an internal combustion engine to drive the valve element 20 to open and close. The moving element 1 is disposed so as to be unrestrictedly movable by a guide drive mechanism that is explained later, within a magnetic field generated by a winding 2 as a magnetic force source. The guide drive mechanism of the moving element 1 has the same configuration as the guide drive mechanism of a valve rod 12 in the valve driving apparatus disclosed in Japanese Patent Laid-Open Publication No. 2000-199411.

Figure 3:
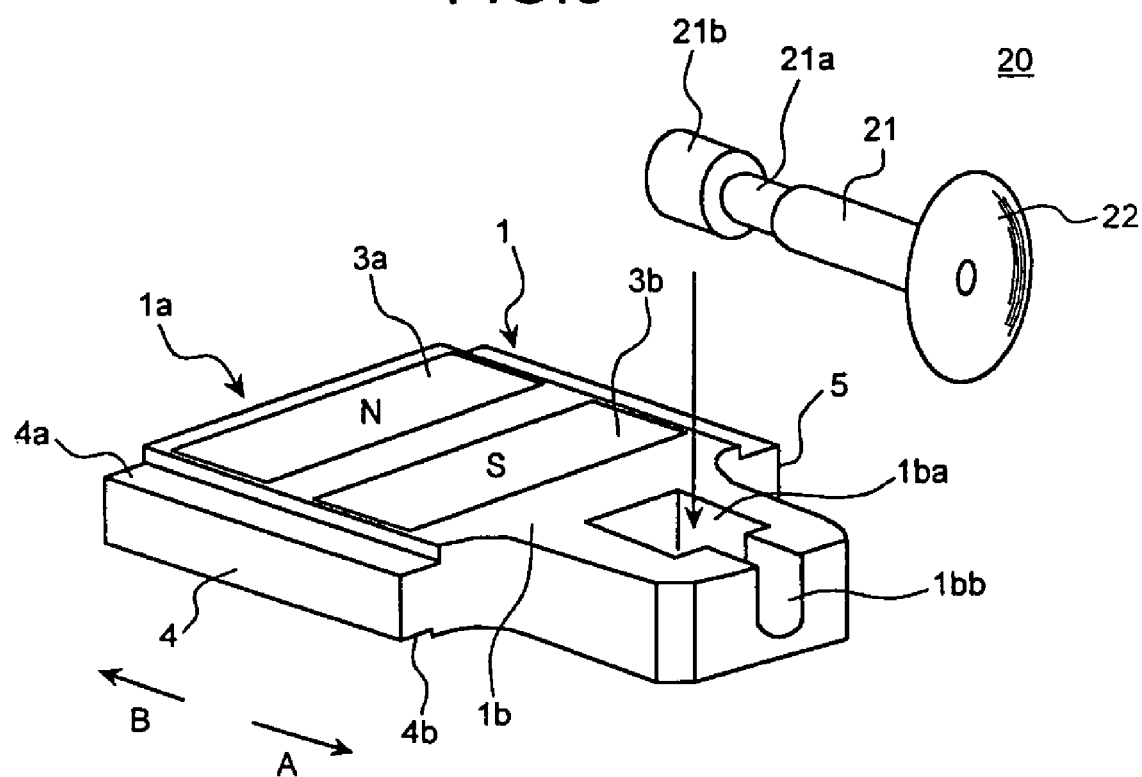
FIG. 3 is an exploded perspective view showing a coupling state between the moving element and the valve element to be driven in the opening-closing valve driving apparatus of FIG. 1.
Figure 4:
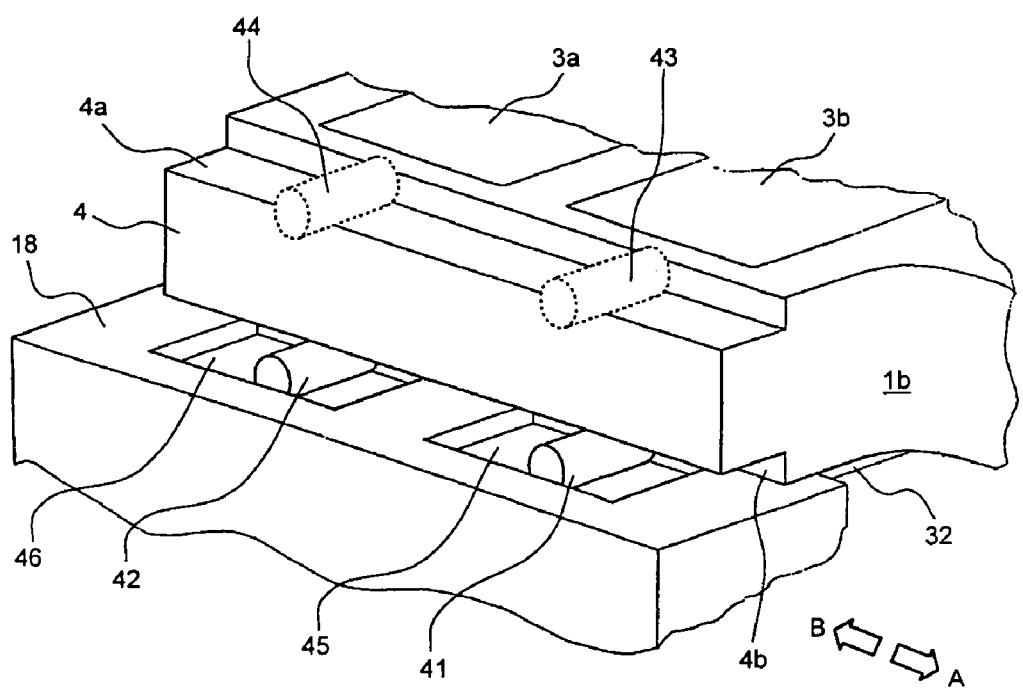
FIG. 4 is a perspective view partially showing a supporting mechanism of the moving element in the opening-closing valve driving apparatus of FIG. 1.

In other words, as clearly shown in particular in FIG. 3, the moving element 1 is a flat component, as a whole, that can freely move in the directions of arrows A and B. The moving element 1 further comprises a rectangular magnet holding portion 1a and a locking portion 1b integrally connected to the front end of the magnet holding portion 1a. The magnet holding portion 1a has a pair of through holes of rectangular cross section, and a pair of flat rectangular magnets 3a and 3b is fitted in these through holes. The magnets 3a and 3b are magnetized so as to have a magnetized upper surface and lower surface thereof in FIG. 4, and magnetized directions of the two surfaces are opposite to each other. As shown in FIG. 4, for example, the magnetized upper surface of the magnet 3a is the N pole and the magnetized upper surface of the magnet 3b is the S pole. Guide protrusions 4 and 5 are formed on both sides of the magnet holding portion 1a. The guide protrusions 4 and 5 have a thickness slightly smaller than the height of one side of the magnet holding portion 1a. Further, guide grooves 4a and 4b are formed respectively by the upper surface and lower surface of the guide protrusion 4 and a side face of the magnet holding portion 1a. As clearly shown from FIG. 4, two roller pairs 41, 42 and 43, 44 are engaged with the guide grooves 4a and 4b to hold the guide protrusion 4 so as to guide the magnet holding portion 1a, that is, the moving element 1. The guide protrusion 5 has a configuration similar to that of the guide protrusion 4, although it is not shown herein.

Supporting frames 11 and 11' are identically formed to have a substantial A-character shape and are positioned opposite to each other with the moving element 1 and the winding 2 therebetween. The supporting frame 11 comprises a top 12, a pair of legs 13a and 13b, and a bracket 14 provided between the legs 13a and 13b. The supporting frame 11' has the same construction as that of the supporting frame 11. Further, a lower frame 18 is located between free ends of the legs 13a and 13b of the supporting frame 11. Similarly, a lower frame 18' is located between free ends of the legs of the supporting frame 11'. The lower frames 18 and 18' are pulled upward in the figure by magnetic forces of the magnets 3a and 3b.

A yoke 31, having a substantially C-character shape in cross section in the moving direction of the moving element 1, is held between the supporting frames 11 and 11'. Further, a substantially rectangular parallelepiped yoke 35 is provided at the center of the yoke 31. As clearly shown in FIG. 2, two end faces 34 and 36 of the yoke 31 and the yoke 35 face the pair of magnets 3a and 3b supported by the moving element 1. Further, a substantially rectangular parallelepiped yoke 32 faces the yoke 31 with the moving element 1 between the two yokes. The yoke 32 is fixed between the lower frames 18 and 18', a winding core (not shown) is provided around the yoke 35, and the winding 2 is wound around the core. When current is supplied to the winding, a magnetic field is created between the end faces 34 and 36 of the yoke 31 and the yoke 35, and further the yoke 32, to allow the moving element 1 to move.

Roller holding grooves 45 and 46 are formed on the upper surface of the lower yokes 18 and 18' along the moving direction of the moving element 1, and the rollers 41 and 42 are held so as to be movable within the respective roller holding grooves 45 and 46 in the moving direction of the moving element 1. On the other hand, roller holding grooves (not shown) are provided in the lower surface of the bracket 14 so as to face the roller holding grooves 45 and 46. In this manner, the rollers 43 and 44 are held so as to be movable within these roller holding grooves in the moving direction of the moving element 1. As a similar roller holding mechanism is formed in the supporting frame 11' and the lower frame 18', the moving element 1 can smoothly move in the directions A and B.

According to the guide drive mechanism of the moving element 1, the moving element 1 can be moved by a moving amount in substantial proportion to the magnitude of drive current supplied to the winding 2. The basic principles of the guide drive mechanism are similar to those disclosed in Japanese Patent Laid-Open Publication No. 2000-199411 and hence detailed explanation will be omitted here.

Next, how the locking portion 1b of the moving element 1 and the valve rod 21 are engaged with each other will be explained with reference to FIG. 3. That is, the locking portion 1b has a substantially rectangular parallelepiped shape as a whole and has a locking hole 1ba. The locking hole 1 ba has a rectangular cross section within a plane in parallel to the main plane of the moving element 1. An engaging groove 1bb having a substantially U-shaped cross section is provided at a front-end wall portion between the inner wall of the locking hole 1ba and the front-end face of the locking portion 1b.

On the other hand, the valve element 20 has a smaller diameter portion 21a formed near the rear end of the valve rod 21. The valve element 20 further has a larger diameter locking portion 21b provided at the front end of the smaller diameter portion 21a. The smaller diameter portion 21a of the valve rod 21 is fitted into the engaging groove 1bb. The valve rod 21 and the moving element 1 are coupled to each other by a mechanism for providing the coupling between the locking portion 1b and the valve rod 21 so as to enable relatively free movement of the valve rod and the moving element to each other within a restricted range that is equivalent to a difference between the length of the smaller diameter portion 21a and the thickness of the front-end wall portion of the locking portion 1b.

It is noted that, in order to ensure the relative movement of the valve element 20 and the moving element 1 within the restricted range, the faces of both ends of the smaller diameter portion 21a are perpendicular to the valve rod, and both sides of the front-end wall portion of the locking portion are flat. However, both sides of the front-end wall portion may also be formed as mutually inclined planes or curved planes.

The operation of the opening-closing valve driving apparatus will be explained in detail with reference to FIG. 5 and FIG. 6.

Figure 5:
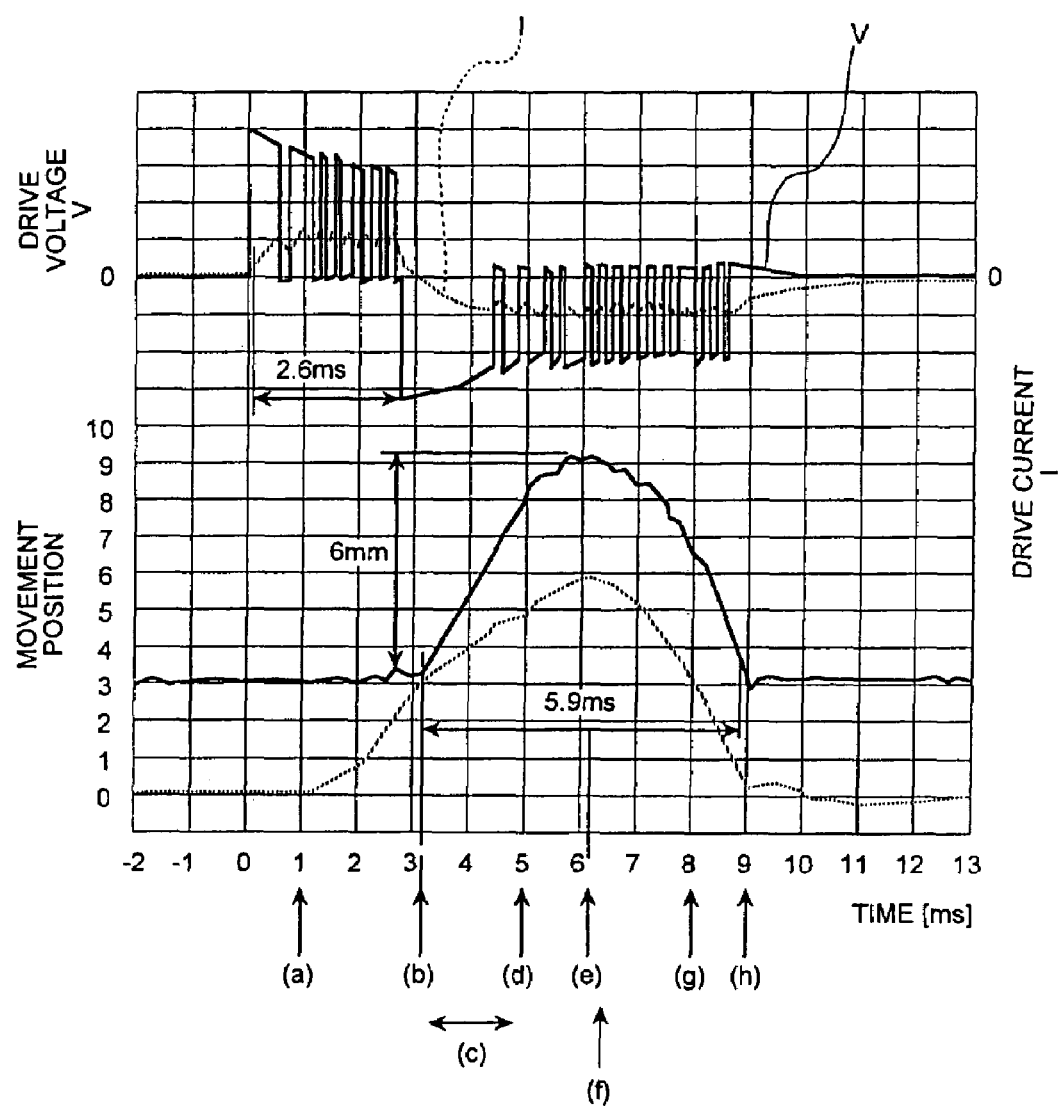
FIG. 5 is a graph showing a relation between a drive voltage and a drive current and a relation between changes in movement positions of the moving element and the valve element in the opening-closing valve driving apparatus of FIG. 1.
Figure 6:
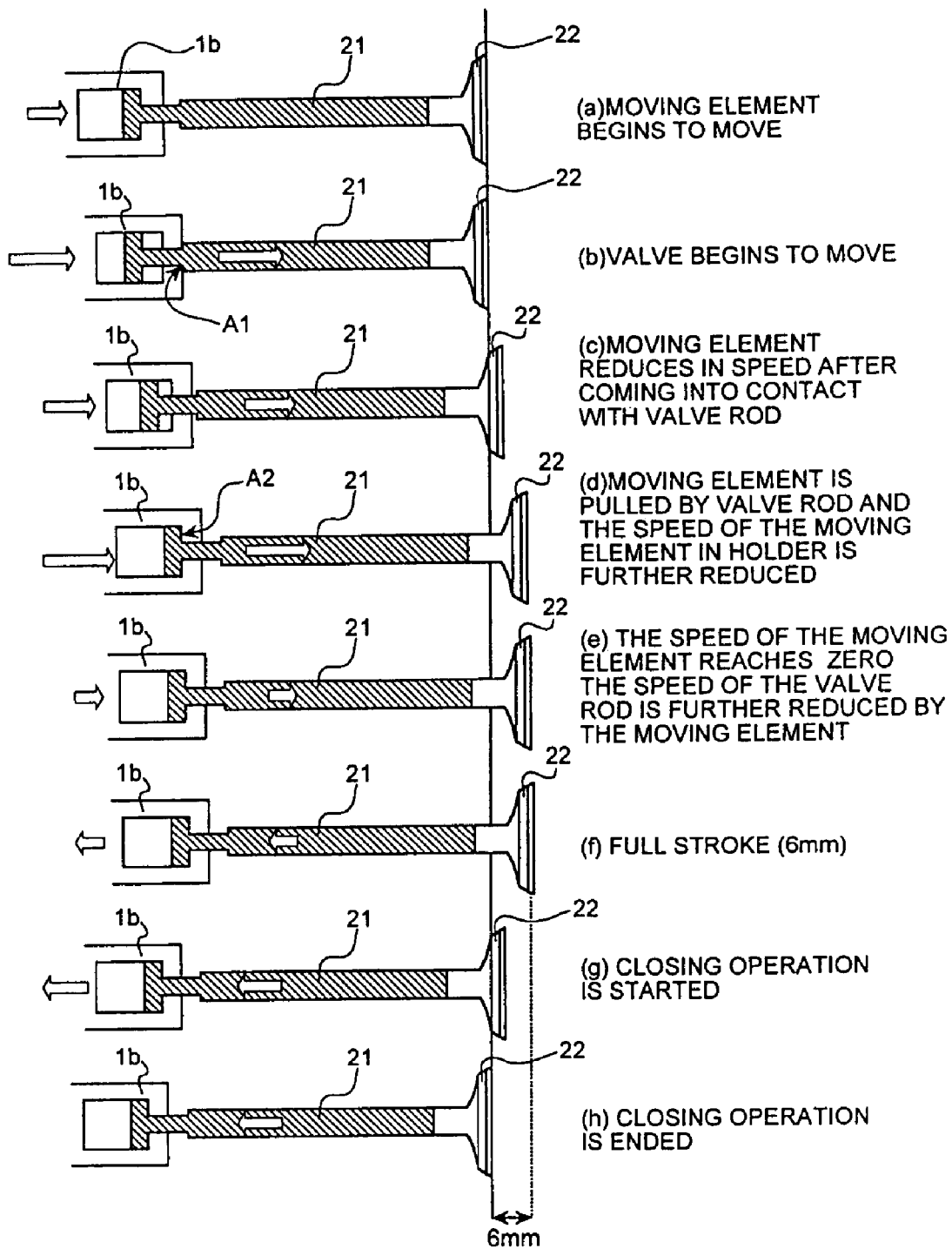
FIG. 6 shows operational diagrams of positional relations between the moving element and the driven valve element in the opening-closing valve driving apparatus of FIG. 1.

As shown by a solid line in the upper side of the graph of FIG. 5, a drive voltage V including a positive rising pulse group in a period of, for example, 2.6 milliseconds from a point of time zero, is supplied to both ends of the winding 2. In response to the supply, a current I as indicated by a dotted line starts passing through the winding 2. Consequently, as indicated by a dotted line in the lower part of FIG. 5, the moving element 1 begins to move toward the front from a point of time (a). This state is shown in FIG. 6(a).

Next, when the drive voltage V is changed to a reduced speed pulse group within a period of about 5.9 ms, the current I becomes a negative drive current, thereby making it possible to reduce the moving speed of the moving element 1. In this manner, at time (b) when such a negative drive current is supplied to start decreasing the moving speed of the moving element 1, the amount of movement of the moving element 1 reaches, for example, 3 mm. Then, the front-end wall of the locking portion 1b of the moving element 1 comes into contact with the front boundary A1 of the smaller diameter portion 21a of the valve rod 21, and the valve rod 21 begins to move toward the right by being pressed. This state is shown in FIG. 6(b).

The contact of the moving element 1 with the valve rod 21 reduces the speed of the moving element 1. On the other hand, the valve rod 21 moves toward the front, that is, in a valve opening direction at a substantially constant speed yet at a higher speed as compared to that of the moving element 1 to increase the lift amount of the opening-closing valve. The moving speed of the valve rod 21 is higher than the moving speed of the moving element 1, and therefore the end face of the larger-diameter locking portion 21b of the valve rod 21 comes into contact with a rear-end face A2 of the front-end wall portion of the locking portion 21-1b.

Thus, the moving element 1 acts so as to be pulled by the valve rod 21. This state is shown in FIG. 6(d).

Further, at time (e), the speed of the moving element 1 is further reduced to approach the speed zero, and when the valve rod 21 reaches a maximum stroke position at around 6 mm at time (f), the moving element 1 begins to return back to the original position. This state is shown in FIGS. 6(e) and (f).

Further, at time (g), a valve head 22 approaches a valve seat (not shown) for the opening-closing valve through returning operation of the moving element 1. Finally, the moving element 1 returns to the vicinity of the initial position and then the opening-closing valve closes. This state is shown in FIGS. 6(g) and (h).

As is clear from the operation, the change in the movement positions of the valve rod 21 (indicated by the solid line in the lower part of FIG. 5) is more rapid as compared to the change in the movement positions of the moving element 1 (indicated by the dotted line in the lower part of FIG. 5). Therefore, it is possible to ensure a lift amount sufficient for opening the valve in a short period. In other words, it is possible to obtain a more increased lift amount for opening the valve in comparison with the drive power in the opening-closing valve driving apparatus of the present invention.

In the first embodiment, since the configuration in which the moving element 1 and the valve rod 20 mutually move each other within a restricted range is employed, kinetic energy stored in the moving element 1 is conveyed to the valve element 20. Consequently, a quick opening-closing action of the valve element can be expected.

Figure 7:
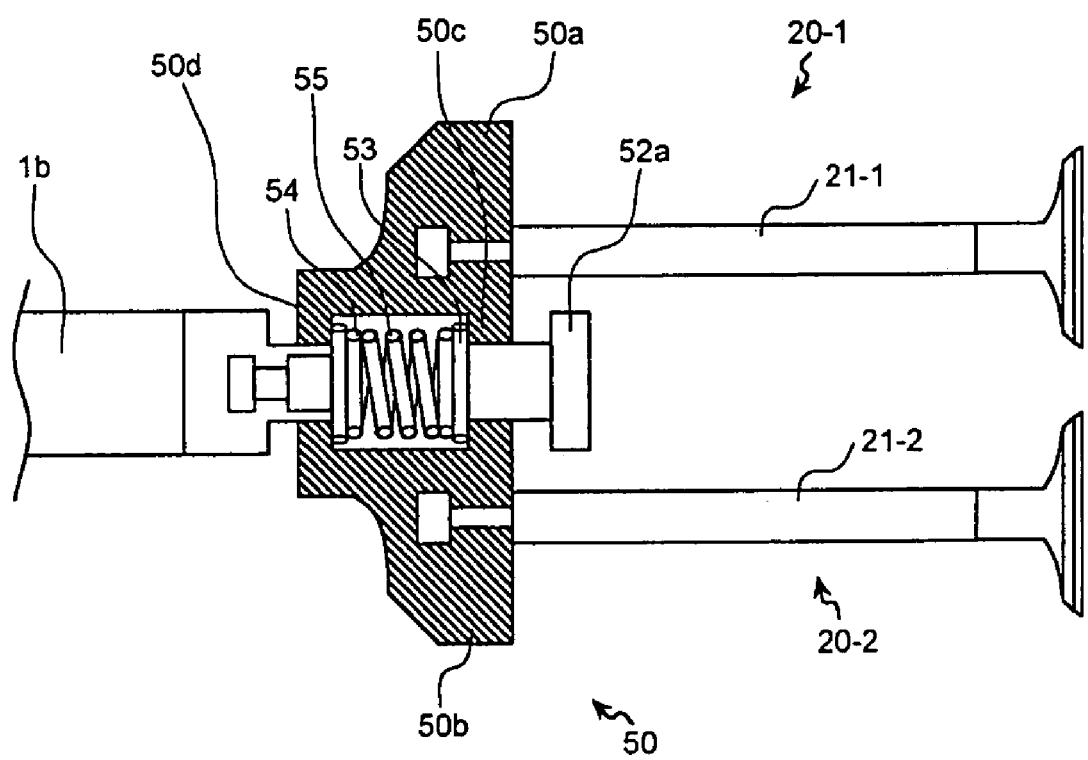
FIG. 7 is a cross sectional view-showing a coupling mechanism of the moving element and the valve element in an opening-closing valve driving apparatus according to a second embodiment of the present invention.
Figure 8:
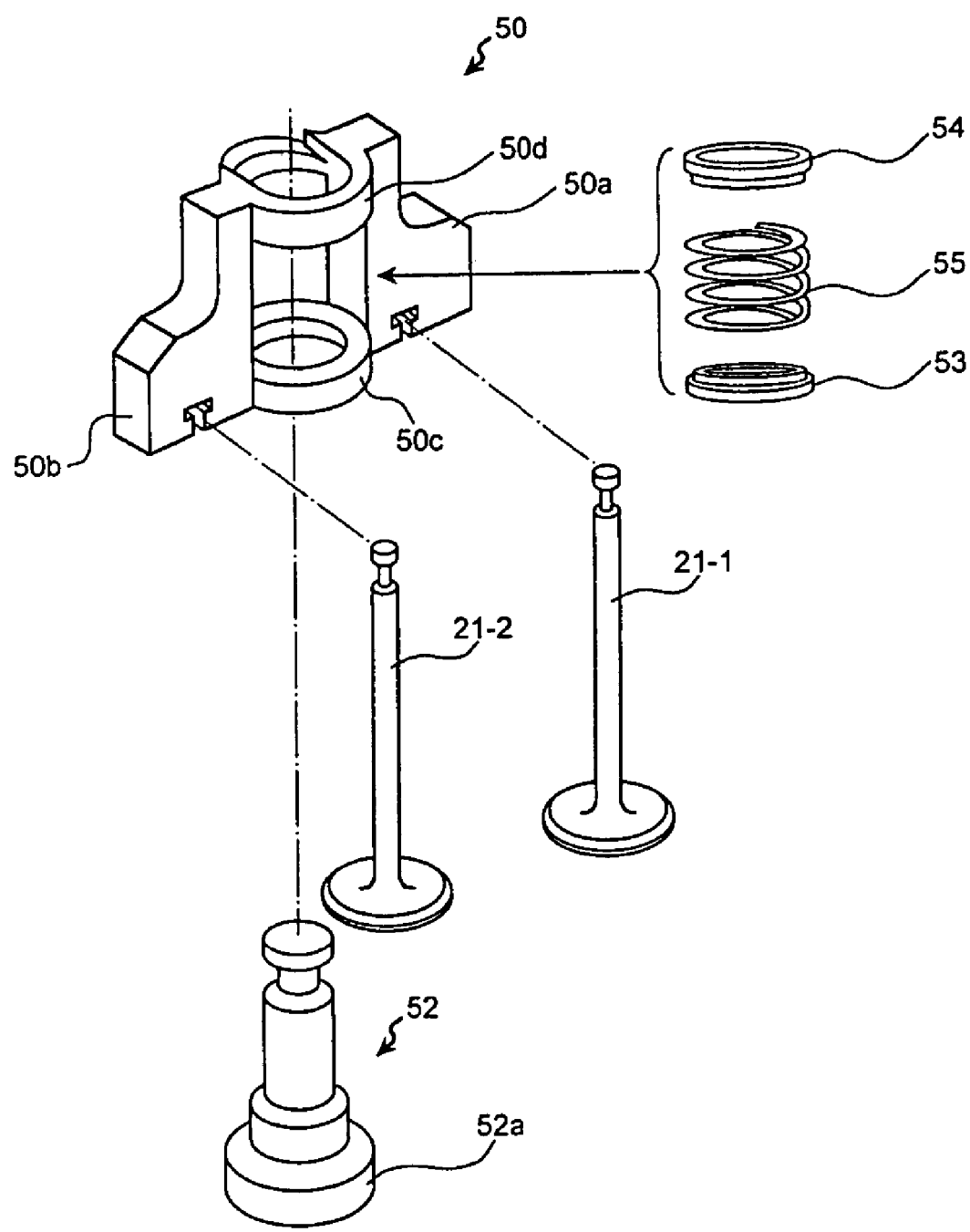
FIG. 8 is an exploded perspective view of the coupling mechanism shown in FIG. 7.

A second embodiment shown in FIG. 7 and FIG. 8 uses a coupling unit including an elastic member.

In the second embodiment, two wing portions 50a and 50b of a valve-element coupling member 50 support two valve elements 20-1 and 20-2 so that the moving element 1 and the valve elements 20-1 and 20-2 are coupled to each other. The wing portions 50a and 50b are coupled to each other by ring sections 50c and 50d. The ring sections 50c and 50d and a rod 52 fixed to the front end 1b of the moving element 1 are mutually slidably engaged with each other. Further, the diameter of a front-end portion 52a of the rod 52 is enlarged to act as a stopper for the ring sections 50c and 50d. The ring section 50d is slidably engaged with the front end of the locking section 1b. Further, a spring 55, as the elastic member, is held by two flanges 53 and 54 and disposed between the front end of the locking section 1b and the ring section 50c.

In this configuration, the coupling unit is formed so that the moving element 1 and the valve elements 20-1 and 20-2 are mutually movably coupled to each other through the spring. It is noted that the drive mechanism of the moving element 1 has the same configuration as that of the first embodiment shown in FIG. 1 to FIG. 4, and hence further explanation will be omitted.

Figure 9:
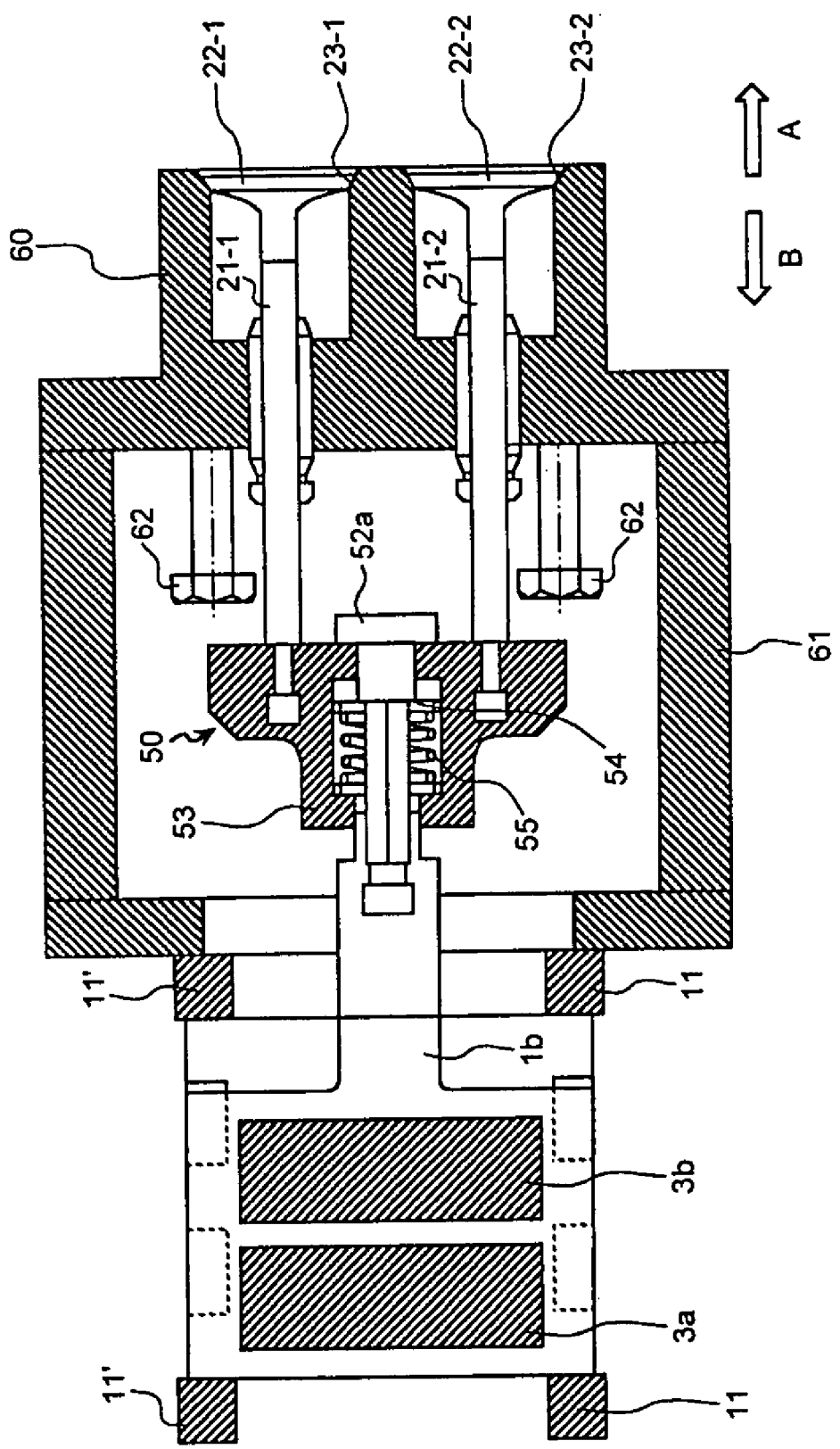
FIG. 9 is a cross sectional view showing how the opening-closing valve driving apparatus according to the second embodiment shown in FIG. 7 is loaded in an engine block.
Figure 10:
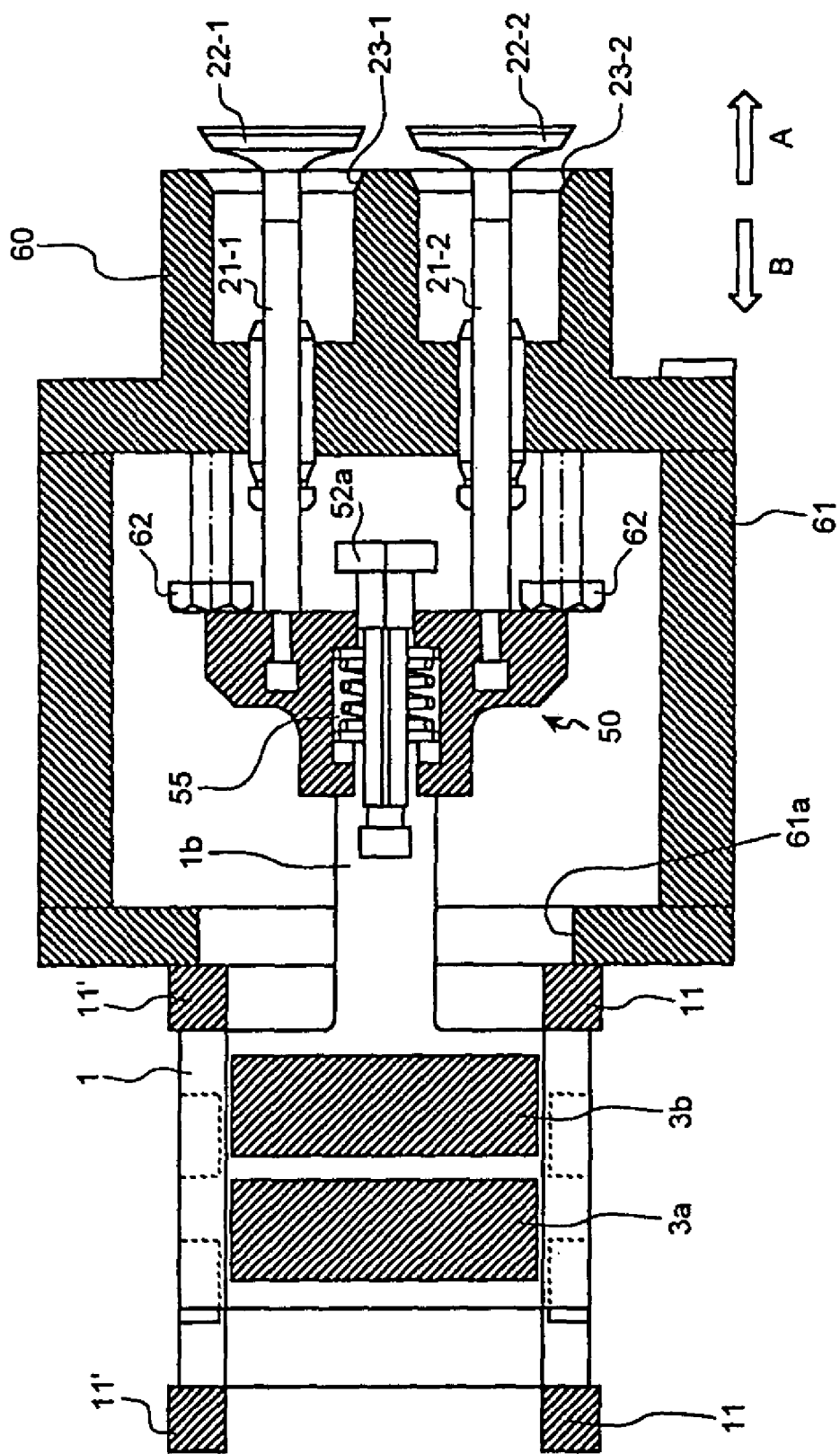
FIG. 10 is a cross sectional view showing an open state of the valve element in the opening-closing valve driving apparatus shown in FIG. 9.

FIG. 9 and FIG. 10 show an example of the configuration of the opening-closing valve driving apparatus according to the second embodiment installed in an engine head 60. That is, the two valve elements 20-1 and 20-2 function as valve elements of two intake valves of a cylinder, and valve rods 21-1 and 21-2 of the valve elements 20-1 and 20-2 are disposed in the cylinder head 60 so as to freely reciprocate. Heads 22-1 and 22-2 of the valve rods, together with valve seats 23-1 and 23-2, open and close intake paths of the cylinder, respectively. The opening-closing valve driving apparatus as shown in FIGS. 7 and 8 is fitted in the cylinder head 60 by a holding frame 61. The holding frame 61 is provided with an opening 61a through which the front-end portion 1b of the moving element 1 freely projects toward the cylinder head 60. The holding frame 61 is further provided with a stopper 62 that controls the maximum stroke of the valve-element coupling member 50.

In the state shown in FIG. 9, a pulling-in-drive current flows to the winding 2 so that electromagnetic force directed to the side B of the figure is applied to the moving element 1, and the opening-closing valve is in the valve closing state. The valve-element coupling member 50 is in contact with the front-end enlarged portion 52a of the rod 52 and is slightly apart from the front-end portion 1b of the moving element 1. In this case, the spring 55 is compressed to provide mechanical bias toward the right-hand side, that is, the direction A of the figure, to the moving element 1.

In such a state, when a pushing-drive current is supplied to the winding 2 so that the moving element 1 is pushed toward the right-hand side, a drive force to push the moving element 1 is added to the mechanical bias to move the moving element 1 in the direction A. Therefore, as shown in FIG. 10, the front end 52a of the rod 52 moves in the direction A prior to movement of the valve-element coupling member 50. Then, after the spring 55 is compressed, the front-end face of the front-end portion 1b of the moving element comes into contact with the rear-end face of the valve-element coupling member 50 to further push the valve-element coupling member toward the direction A to allow the member to move.

Figure 11:
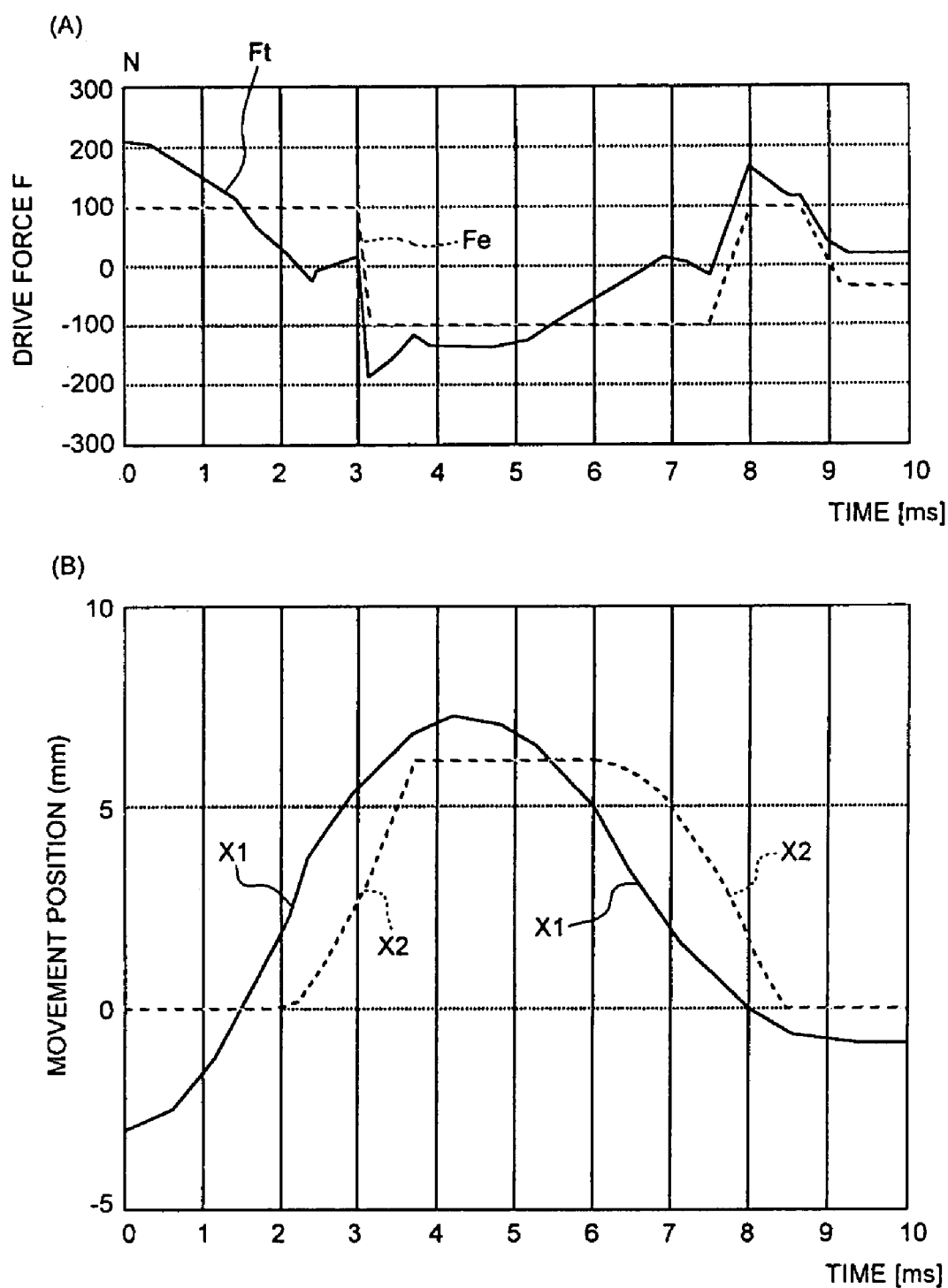
FIG. 11 shows graphs of changes in electromagnetic force and in the force imparted to the moving element in association with the change, and changes in positions of the moving element and the valve element in the opening-closing valve driving apparatus shown in FIG. 9 and FIG. 10.

The movement of the valve elements 20-1 and 20-2 in association with the movement of the moving element 1 by supplying the drive current to the winding in the second embodiment is explained below with reference to FIG. 11.

As shown by a dotted line Fe in the graph of FIG. 11(A), the electromagnetic drive force imparted to the moving element 1 by the winding 2 is −100 N at time zero. In this initial state, as shown in FIG. 9, the moving element 1 is deviated by only 3 mm from the center position in the direction B or in the negative direction to compress the spring 55 by a force of 100 N. Therefore, a solid curve X1 indicating the movement of the moving element 1 in the graph of FIG. 11(B) shows that the initial position of the moving element 1 is −3 mm. At this time, both of the valve elements 20-1 and 20-2 are located at the position zero, that is, the full closing position of the opening-closing valve as shown by a dotted curve X2.

In this state, when the drive current I reaches a rated current value immediately after time zero, the electromagnetic drive force Fe reaches, for example, 100 newtons (N). Then, the moving element 1 begins to move toward the direction A from the state of FIG. 9, that is, from the position of −3 mm as shown by the curve X1 of FIG. 11(B). At this time, a total force Ft=(Fe+Fk) of the electromagnetic drive force Fe applied to the moving element 1 and a force Fk of the spring 55 in the compressed state is added to the moving element 1. This state is shown by a curve Ft of FIG. 11(A). Therefore, the moving element 1 is rapidly accelerated in the direction A. When the moving element 1 reaches the zero position (the position at which the spring 55 comes to a neutral position in a stand-still state) after around 1.5 ms, the force Fk by the spring 55 becomes zero and the total force Ft becomes equal to the electromagnetic drive force Fe. Therefore, as indicated by the curve X1 of FIG. 11(B), the moving element 1 is added with its inertia force to continue to move in the A direction. However, as the spring 55 shrinks, the force Fk of the spring 55 becomes a value in the B direction, that is, a negative value, and therefore the total force Ft falls to less than the electromagnetic drive force Fe.

On the other hand, from the time immediately after the moving element 1 reaches the zero position, the valve-element coupling member 50 begins to move toward the direction A. Thereafter, as shown by the curve X2 of FIG. 11(B), the valve-element coupling member 50 rapidly moves in the direction A as the spring 55 is extended, and the valve heads 22-1 and 22-2 rapidly move away from the valve seats so that the opening-closing valve is open. As clearly shown by the curve X2 of FIG. 11(B), this change in the movement positions of the valve-element coupling member 50 is steep, which indicates that the valve opening speed of the opening-closing valve is a high speed.

At the point in time at which about 3 ms passes from the time zero, the current supply to the winding 2 is reversed. Here, a negative drive force of, for example, −100 N acts so as to bring back the moving element 1 by the magnetic force of the magnets 3a and 3b. At this time, as clearly shown by the curve X2, the valve-element coupling member 50 still continues to move in the A direction. The total force Ft on the moving element 1, added to by the spring load Fk, reaches a value close to −200 N. Following this, the moving element 1 enters into the returning operation at around the point in time at which about 1 ms passes. Then, the spring 55 begins to shrink in the valve opening direction through the neutral state. The total force Ft added to the moving element 1 becomes less than the magnetic force Fe in absolute value. Based on this, the moving element 1 gradually reduces in speed and moves toward the home position or the initial position as clearly shown by the curve X1. In association with this, as shown by the curve X1, the valve-element coupling member 50 also begins to return toward the closing position at a fast rate also caused by the shrinking operation of the spring 55. The pushing-drive current flows to the winding 2 in a period from the time immediately before the moving element 1 reaches the position zero until about 1 ms passes. In this manner, by reducing the speed of the returning operation of the moving element 1, it is possible to reduce the impact produced when the valve is closed. Hence, a force toward the direction A due to the shrinking of the spring 55 is added to the moving element 1, and the total force Ft becomes greater by the force added thereto.

When the moving element 1 is moving towards the initial position after passing through the zero position, the valve-element coupling member 50 returns back at a high speed and the valve heads 22-1 and 22-2 are seated on the valve seats.

As can be clearly understood from the above explanation, the spring 55 is disposed between the moving element 1 and the valve-element coupling member 50. When the opening-closing valve is open or closed, the spring 55 is compressed and the elastic energy is stored in the spring 55, and therefore it is possible to expect a rapid opening operation of the valve element when the valve is to be open and a rapid closing operation of the valve element when the valve is to be closed.

It is noted that the pulling-in-drive current is regulated based on operational conditions. For example, when the engine speed is equal to or lower than a predetermined speed, it is possible to cope with the valve opening and closing speed even if the elastic energy is not stored.

INDUSTRIAL APPLICABILITY

As clearly understood from the explanation, the opening-closing valve driving apparatus according to the present invention employs a configuration such that the moving element driven by the electromagnetic actuator and the valve element of the opening-closing valve are coupled to each other while relative movements of the two are mutually allowed. In this manner, it is possible to improve the opening and closing speed of the opening-closing valve and also achieve a lift amount sufficient for opening the valve without increasing the size of the apparatus and increasing power consumption.

What is claimed is:

1. An opening-closing valve driving apparatus for driving an opening-closing valve, comprising:
   an electromagnetic actuator including an electromagnetic coil and a moving element that moves in response to excitation of the electromagnetic coil; and
   a coupling unit that couples the moving element to a valve element of the opening-closing valve so as to enable relative movement of the moving element and the valve element within a predetermined restricted range in a moving direction of the moving element;
   wherein the coupling unit includes:
      a smaller diameter portion provided in a part near a front end of a valve rod of the valve element, and
      an engaging piece having a groove that is provided in a front end of the moving element and is engaged with the smaller diameter portion,
      wherein the engaging piece has a flat end face intersecting the moving direction, and
      wherein a boundary surface of the smaller diameter portion with another part of the valve rod faces the flat end face.

2. The opening-closing valve driving apparatus according to claim 1, wherein the opening-closing valve is at least one of an intake valve and an exhaust valve of a vehicle-mounted internal combustion engine.

3. The opening-closing valve driving apparatus according to claim 1, wherein the electromagnetic actuator is a linear type in which the moving element moves by a distance in substantial proportion to a magnitude of current supplied to the electromagnetic coil.

4. The opening-closing valve driving apparatus according to claim 3, wherein the opening-closing valve is at least one of an intake valve and an exhaust valve of a vehicle-mounted internal combustion engine.

5. An opening-closing valve driving apparatus for driving an opening-closing valve, comprising:
   an electromagnetic actuator including an electromagnetic coil and a moving element that moves in response to excitation of the electromagnetic coil; and
   a coupling unit that couples the moving element to a valve element of the opening-closing valve so as to enable relative movement of the moving element and the valve element within a predetermined restricted range in a moving direction of the moving element;
   wherein the electromagnetic actuator is a linear type in which the moving element moves by a distance in substantial proportion to a magnitude of current supplied to the electromagnetic coil; and
   wherein the opening-closing valve is at least one of an intake valve and an exhaust valve of a vehicle-mounted internal combustion engine.

* * * * *